United States Patent
Kassa et al.

(10) Patent No.: US 6,620,501 B1
(45) Date of Patent: Sep. 16, 2003

(54) PAINTABLE SEAL SYSTEM

(75) Inventors: Abraham Kassa, Shelby Twp., MI (US); Renee Bradley, St. Clair, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/923,138

(22) Filed: Aug. 6, 2001

Related U.S. Application Data

(60) Provisional application No. 60/223,667, filed on Aug. 7, 2000.

(51) Int. Cl.[7] .............................................. B32B 15/04
(52) U.S. Cl. .................... 428/355 R; 428/480
(58) Field of Search ...................... 277/630; 428/355 R, 428/343, 221, 480

(56) References Cited

U.S. PATENT DOCUMENTS

| | | | |
|---|---|---|---|
| 3,839,078 A | * 10/1974 | Birchall et al. | ............ 427/377 |
| 3,927,244 A | * 12/1975 | Ogura et al. | ................ 428/483 |
| 4,427,481 A | 1/1984 | Smith et al. | |
| 4,538,380 A | 9/1985 | Colliander | |
| 4,605,460 A | * 8/1986 | Schirmer | .................... 156/229 |
| 4,693,775 A | 9/1987 | Harrison et al. | |
| 4,724,243 A | 2/1988 | Harrison | |
| 4,749,434 A | 6/1988 | Harrison | |

(List continued on next page.)

FOREIGN PATENT DOCUMENTS

| EP | 0 442 178 A1 | 8/1991 |
|---|---|---|
| JP | 4059820 | 2/1992 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 01/57130 | 8/2001 |
| WO | WO 01/88033 | 11/2001 |

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Copending application Ser. No. 09/939,245, filed Aug. 24, 2001.
Copending application Ser. No. 09/847,252, filed May 2, 2001.
Copending application Ser. No. 09/858,939, filed May 16, 2001 (formerly Provisional application Ser. No. 60/225, 126).
Copending application Ser. No. 09/502,686, filed Feb. 11, 2000.
Copending application Ser. No. 09/459,756, filed Dec. 10, 1999.
Copending application Ser. No. 09/676,335, filed Sep. 29, 2000.
Copending application Ser. No. 09/676,443, filed Sep. 29, 2000.
Copending application Ser. No. 09/676,725, filed Sep. 29, 2000.
Copending application Ser. No. 09/524,961, filed Mar. 14, 2000.

*Primary Examiner*—Anthony Knight
*Assistant Examiner*—Lisa Bannapradist
(74) *Attorney, Agent, or Firm*—Dobrusin & Thennisch PC

(57) ABSTRACT

A system for sealing a plurality of panels including a multiplayer seal having a barrier portion and an adhesion portion.

13 Claims, 1 Drawing Sheet

U.S. PATENT DOCUMENTS

| | | |
|---|---|---|
| 4,769,166 A | 9/1988 | Harrison |
| 4,898,630 A | 2/1990 | Kitoh et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,453,462 A * | 9/1995 | Watanabe et al. .............. 525/57 |
| 5,470,886 A | 11/1995 | Makhlouf et al. |
| 5,648,401 A | 7/1997 | Czaplicki |
| 5,712,317 A | 1/1998 | Makhlouf et al. |
| 5,783,272 A | 7/1998 | Wong |
| 5,884,960 A | 3/1999 | Wycech |
| 5,931,474 A * | 8/1999 | Chang et al. ................ 277/316 |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A * | 2/2000 | Johnson et al. .............. 428/343 |
| 6,040,350 A | 3/2000 | Fukui |
| 6,057,382 A | 5/2000 | Karim et al. |
| 6,077,884 A | 6/2000 | Hess et al. |
| 6,086,138 A * | 7/2000 | Xu et al. ................ 296/146.15 |
| 6,096,791 A | 8/2000 | Born et al. |
| 6,133,335 A * | 10/2000 | Mahoney et al. .............. 522/29 |
| 6,136,398 A | 10/2000 | Willett et al. |
| 6,136,944 A | 10/2000 | Stewart et al. |
| 6,153,302 A | 11/2000 | Karim et al. |
| 6,162,504 A | 12/2000 | Hubert et al. |
| 6,174,932 B1 | 1/2001 | Pachl et al. |
| 6,218,442 B1 | 4/2001 | Hilborn et al. |
| 6,228,449 B1 | 5/2001 | Meyer |
| 6,235,842 B1 | 5/2001 | Kuwano et al. |
| 6,244,601 B1 * | 6/2001 | Buchholz et al. ............ 277/637 |
| 6,263,635 B1 | 7/2001 | Czaplicki |
| 6,277,898 B1 | 8/2001 | Pachl et al. |
| 6,284,360 B1 * | 9/2001 | Johnson et al. .......... 428/317.7 |
| 6,287,669 B1 * | 9/2001 | George et al. .............. 428/156 |
| 6,291,059 B1 * | 9/2001 | Mahoney et al. ......... 428/317.3 |
| 6,312,668 B2 | 11/2001 | Mitra et al. |
| 6,316,099 B1 * | 11/2001 | George et al. .......... 428/355 EP |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,403,159 B1 * | 6/2002 | Lim .......................... 427/359 |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,150 B1 * | 9/2002 | Sheppard et al. ............ 428/327 |
| 6,455,476 B1 | 9/2002 | Imai et al. |
| 6,489,023 B1 * | 12/2002 | Shinozaki et al. ...... 428/355 EP |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |

\* cited by examiner

PAINTABLE SEAL SYSTEM

CLAIM OF BENEFIT OF FILING DATE

The present application claims the benefit of the filing date of U.S. Provisional Application Serial No. 60/223,667, filed Aug. 7, 2000, the contents of which are hereby incorporated by reference.

FIELD OF THE INVENTION

The present invention relates to paintable seals and more particularly to paintable seals for covering joint seams in an automotive vehicle.

BACKGROUND OF THE INVENTION

It is common in the manufacture of automotive vehicles and other structures to join two panels together. The panels may be joined mechanically or using a suitable bonding technique. Often a joint will include a combination. For instance, in automotive roof ditch applications two panels are commonly joined to form a lap joint, which is then spot welded along the length of the weld. The joint then needs to be sealed to protect the vehicle interior from harsh environmental conditions. In some, but not necessarily all applications, the seal may also be painted and optionally a vehicle trim strip applied thereto. Accordingly, there is a need for a sealing system that meets the above engineering design criteria.

Patents that may be of interest relative to the present invention include U.S. Pat. Nos. 5,948,508 (issued Sep. 7, 1999 to Pastore et al); 5,964,979 (issued Oct. 12, 1999 et al); and 6,030,701 (issued Feb. 29, 2000 to Johnson et al); all three of which are hereby expressly incorporated by reference herein for all purposes.

SUMMARY OF THE INVENTION

The systems of the present invention provide a unique multilayer sealing article and method of using the same. In general, the present invention includes a first barrier portion and a second adhesion portion attached to the first barrier portion. In one embodiment, the first barrier portion includes a plastic sheet material having at least three different layers. The materials are of sufficient thickness, composition, and microstructure so that an exposed surface of the first barrier portion can be coated, such as with commonly encountered urethane coating systems employed in automotive painting operations. The resulting finish of the coated article meets automotive original equipment manufacturer specifications for quality and finish. In one embodiment, the multilayer article of the present invention is placed over a joint between at least two body panels and heated to cause the adhesion layer to spread over the joint and seal it.

Additional features and advantages of the present invention will be set forth in the description of the preferred and alternative embodiments which follows, and in part will be apparent from the description and/or the attached drawings, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DESCRIPTION OF THE PREFERRED EMBODIMENT

Figure 1:
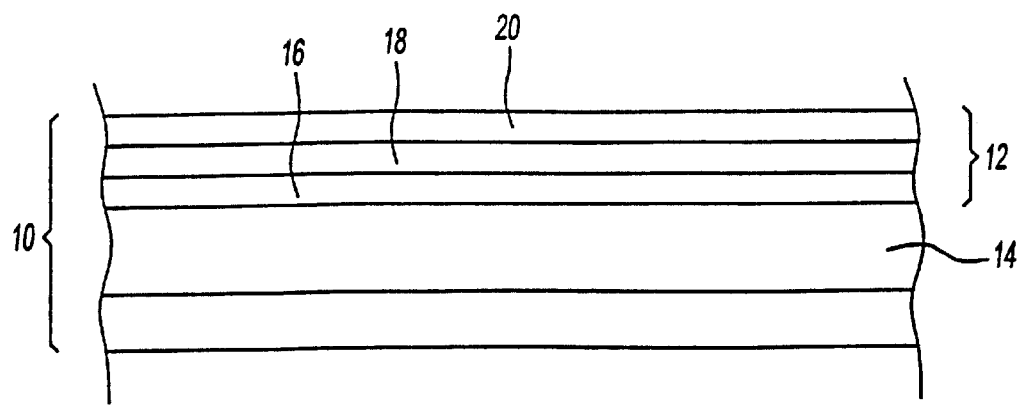
FIG. 1 is a cross-sectional view of the multilayer seal set forth in the preferred embodiment which includes an adhesion portion and a barrier portion consisting of at least a tri-laminate structure.
Figure 2:
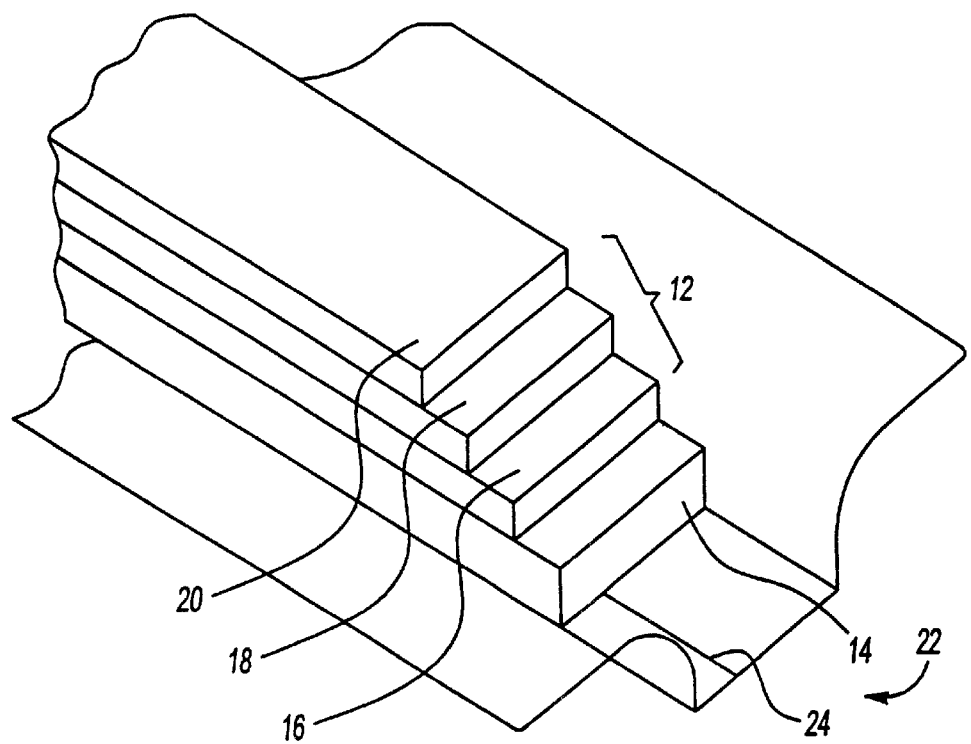
FIG. 2 is a perspective view of the multilayer seal of the present invention showing the adhesion portion in a ditch of a joint seam integrated with a barrier portion consisting of a tri-laminate structure.

In a particularly preferred embodiment referring to FIGS. 1 and 2, a multilayer seal 10 is provided. The seal 10 includes a barrier portion 12 and an adhesion portion 14. Preferably the barrier portion is paintable. In a particularly preferred embodiment, a unique selection of composition, crystallinity and thicknesses of the constituents of the barrier portion combine to offer improved coatability with popular commercial external surface automotive vehicle coating systems.

Accordingly, in a particularly preferred embodiment, the barrier portion of the present invention includes a minor amount of an amorphous plastic material and a major amount of a crystalline plastic material. More preferably, the amorphous material is present in an amount up to about ⅓ of the barrier portion and the crystalline material is present in an amount of up to about ⅔ of the barrier portion. Though a monolayer having a combination of these structures may be employed, preferably a plurality of layers (at least two, and more preferably three or more) are employed with the layers each exhibiting a different amount of crystallinity.

In a highly preferred embodiment, referring to FIG. 1, the barrier portion 12 includes a tri-laminate structure having a first layer 16, a second layer 18 and a third layer 20. Though three different materials may be employed respectively in each of the layers, in a preferred structure, the first and the third layers are generally the same. In one embodiment, therefore, the first layer 16 and the third layer 18 are each about ⅛ the thickness of the barrier portion and are each an amorphous plastic material. The second layer makes up the balance of the barrier portion and is a crystalline plastic material. The thickness of the barrier portion is preferably about 600 gauge (e.g. about 150 microns), though other thicknesses are possible (e.g. 400 gauge).

As further seen in FIG. 2, the multilayer seal 10 of the present invention is used for placement in a ditch 22 having a joint seam 24 of a standard automotive or aerospace application whereby the adhesion portion 14 is placed into contact with the barrier portion 12 having a tri-laminate structure which consists of a first layer 16, a second layer 18 and a third layer 20. It is also contemplated that decorative trim or moldings may be placed on the barrier portion 12.

In one embodiment, the plastic material for the barrier portion preferably has a density of about 1.4 g/cc.

| Typical Values for Major Properties | | | | | | |
|---|---|---|---|---|---|---|
| | Metric | | | English | | |
| Property | μm | Values | Units | Gauge | Values | Units | Test |
| OPTICAL | | | | | | |
| Gardner Haze | | | | | 1.0 | % | ASTM D1003 |
| TLT | | | | 400 | 87.0 | % | ASTM D1003-77 (Gardner Haze) |
| | | | | 600 | 86.0 | % | ASTM D1003-77 (Gardner Haze) |
| PHYSICAL | | | | | | |
| C.O.F. (dynamic) | | | | | 0.9 | | ASTM D1894 |
| Density | | | | | 1.40 | g/cc | ASTM D1505 |
| Elongation at Break MD | | | | | 180 | % | ASTM D882A |
| Elongation at Break TD | | | | | 130 | % | ASTM D882A |
| Tensile Strength MD | | | | | 24,000 | psi | ASTM D882A |
| Tensile Strength TD | | | | | 24,000 | psi | ASTM D882A |
| THERMAL | | | | | | |
| Heat Seal Strength | | | | | 1500 | g/inch | DuPont 275 F., 40 PSI, 2 sec. |
| Heat Seal Temp. Range | | | | | 275–375 | F. | 1 sec. @ 40 PSI |
| Shrinkage MD | | | | | 2.0 | % | Unrestrained @ 190 C./5 min |
| Shrinkage TD | | | | | 2.0 | % | Unrestrained @ 190 C./5 min |

The plastic material that makes up the barrier portion 12, in one preferred embodiment, is a two-side heat sealable (to itself or other materials), polyester material (e.g., PET). More preferably it is a material available commercially from DuPont under the name MELINEX® 342.

Accordingly, preferably the material will be a polyethylene terephthalate containing material that may include one or more of the following fillers, in an amount up to about 20 wt. %, namely isophthalate copolymer, barium sulfate, polypropylene, silica, carbon black, titanium dioxide or a mixture thereof. A plurality of coextruded materials of this composition may be employed to make the barrier portion, which preferably results in a relatively smooth surface.

The adhesion layer 14 preferably includes a material that softens and flows at temperatures typically encountered in automotive priming and painting operations. A discussion of the parameters for this step can be found in the aforenoted U.S. Pat. No. 6,030,701, hereby incorporated by reference. However, it is believed that the material used in the present invention for the unique adhesion layer of the present invention provides advantages relative to any previous materials.

In general, the material for the adhesion layer 14 includes a polymer component, an adhesion promoter, a curing agent, and optionally filler, colorant or both. In a particular preferred embodiment, the polymer component includes an olefinic polymer, and more preferably an ethylene copolymer (e.g., ethylene methacrylate) in a major amount.

One illustrative composition, with limitation, includes about 60.5 parts ethylene methacrylate; about 9 parts adhesion promoter (e.g., Cumar 13 from A.T. Calas); about 1.5 parts ethoxylated bisphenol A diacrylate. (e.g., Synpro PLD 8718); about 1 part curing agent (e.g., Varox 231XL); about 1 part reactive polymer (e.g., maleic anhydride modified copolymer of butadiene, such as Ricobond 1756); about 0.05 parts carbon black (e.g., Thermax N991); and about 26.95 parts filler (e.g., calcium carbonate).

In a particular preferred embodiment the composition of the adhesion portion 14 is coextruded with the barrier portion 12 using conventional techniques. The resulting sealing article can then be placed on a surface for sealing. In one embodiment, it is placed over a joint between two body panels of an automotive vehicle. Though commonly the resulting article will be placed over a joint between two sheet metal panels, the sealing article of the present invention can also be used to seal two plastic body panels, as well as one plastic panel and one metal panel. In one specific application (as shown in FIG. 2), without limitation, the sealing article is used to seal a joint 24 that forms in a roof ditch 22 in a vehicle. The upper surface of the barrier portion 12 is suitable for receiving optional molding or trim, such as adhesive backed molding or trim.

The adhesion portion 14 is contacted with the vehicle body at the joint or proximate thereto. The vehicle is then subjected to heat during one or more of a cleaning step, a priming step, or another pre-paint surface preparation step. The heat causes the adhesion portion 14 to soften and spread over the joint. The barrier portion or layer 12 remains substantially in tact during such heating, moving only in response to the flow of the heated adhesion portion. After heating the article is able to receive paint or other coatings, such as during a conventional vehicle painting and baking operation.

By way of illustration, a suitable primer/surfacer is applied and then the coated parts are heated to between about 200° F. (more preferably about 240° F.) to about 320° F. for about 10 to about 90 minutes. A topcoat is applied over the primed surface, and heated to about 240° F. to about 275° F. for about 15 to about 45 minutes, and preferably about 25 minutes. Optionally, a clearcoat layer is applied thereafter. Generally the paint and clearcoat systems employed are urethane based coatings. However, it should be seen that the material and seal disclosed in the present invention could be used in a variety of paint systems and operations including, but not limited to, solvent based, urethane based, and other two component paint systems. Suitable coating systems are available from a variety of sources, including for instance:

1) BASF (e.g., U28, E98/99 and URECLEAR; or U28, E138/139 and STAINGUARD III)/ELPO: CATHO-GUARD 200A
2) DuPont (e.g., 740–200 DB, 407/408 and RK 7160)/ELPO: CORMAX II
3) PPG (80–1146 and SGM line—SGM 1000)/ELPO: ED-5050B Resulting section thicknesses for the sealed sections are about 0.5 to about 3 mm. The tensile strength of the resulting article (i.e., the barrier portion and the adhesion portion) is at least about 4500 kPa and more preferably at least about 5000 kPa. The peel strength of the adhesion portion to the barrier portion is greater than about 70 lb./in (after a bake of about 20 minutes at about 265° F.). Shear strength ranges from at least about 1800 kPa, and more preferably is greater than about 2500 kPa. Elongation of the resulting article exceeds about 160 % and more preferably exceeds about 170 %.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A multilayer seal adapted for placement on the paintable surface of a substrate comprising:
   (a) an adhesion portion that softens and flows when heated to temperatures typically encountered in automotive priming and painting operations; and
   (b) a barrier portion substantially retaining said adhesion portion within the surface of the substrate when said seal is heated to temperatures typically encountered in automotive priming and painting operations, wherein said barrier portion includes a crystalline layer located substantially between a first amorphous layer and a second amorphous layer wherein;
      i) both the first amorphous layer and the second amorphous layer are at least partially formed of a polyethylene terephthalate material; and
      ii) both the first amorphous layer and the second amorphous layer have a thickness that is about one eighth of the thickness of the crystalline layer and the crystalline layer is about two thirds of the entire barrier portion.

2. The seal of claim 1, wherein said adhesion portion includes an ethylene copolymer.

3. The seal of claim 1, further comprising a layer of primer and a urethane based coating.

4. The seal of claim 1, wherein the barrier portion includes a polyester.

5. The seal of claim 1, wherein the adhesion portion is coextruded with the trilaminate barrier portion.

6. The seal of claim 5, wherein the adhesion portion is formed of a melt flow adhesive.

7. The seal of claim 6, wherein the adhesion portion includes an ethylene copolymer.

8. The seal of claim 7, wherein the ethylene copolymer is an ethylene methacrylate.

9. A multilayer seal adapted for placement on the paintable surface of a substrate comprising:
   (a) an adhesion portion that softens and flows when heated to temperatures typically encountered in automotive priming and painting operations, wherein the adhesion portion includes a substantial amount of ethylene methacrylate, an amount of adhesion promoter, an amount of curing agent, an amount of reactive polymer and an amount of filler;
   (b) a barrier portion substantially retaining said adhesion portion within the surface of the substrate when said seal is heated to temperatures typically encountered in automotive priming and painting operations, said barrier portion including a first layer, a second layer, and a third layer wherein;
      i) the first layer and the third, layer are formed of an amorphous plastic material that includes a polyethylene terephthalate material and a filler selected from the group consisting of isophthalate copolymer, barium sulfate, propylene, silica, carbon black and titanium dioxide; and
      ii) the second layer is a crystalline plastic material located substantially entirely between the first layer and the third layer; and
   (c) a primer/surfacer coating substantially covering the barrier portion;
   wherein the adhesion portion adheres to the barrier portion with a peel strength of greater than about 70 lb./in. and wherein the barrier portion and adhesion portion cooperatively provide the seal with a tensile strength of at least about 4500 kPa.

10. The seal of claim 9, further comprising a urethane based coating.

11. The seal of claim 9, wherein both the first layer and the third layer have a thickness that is about one eighth of the thickness of the second layer such that the second layer is about two thirds of the entire barrier portion.

12. The seal of claim 9, wherein the barrier portion includes a polyester.

13. The seal of claim 9, wherein the adhesion portion is coextruded with the trilaminate barrier portion.

* * * * *